(12) United States Patent
Cohen et al.

(10) Patent No.: US 8,812,973 B1
(45) Date of Patent: Aug. 19, 2014

(54) MOBILE DEVICE TEXT-FORMATTING

(75) Inventors: Gabriel Cohen, Alameda, CA (US); Simon Raess, New York, NY (US); Ian Gunn, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/249,601

(22) Filed: Sep. 30, 2011

Related U.S. Application Data

(63) Continuation of application No. 12/961,970, filed on Dec. 7, 2010.

(51) Int. Cl.
*G06F 3/048* (2013.01)
*G06F 3/033* (2013.01)
*G06F 17/00* (2006.01)

(52) U.S. Cl.
USPC ............................ 715/773; 715/269; 715/863

(58) Field of Classification Search
USPC ......................... 715/269, 773, 863, 827, 771
See application file for complete search history.

(56) References Cited

U.S. PATENT DOCUMENTS

| | | | | |
|---|---|---|---|---|
| 4,899,136 A | * | 2/1990 | Beard et al. | 345/156 |
| 5,153,577 A | | 10/1992 | Mackey et al. | |
| 5,495,577 A | * | 2/1996 | Davis et al. | 715/238 |
| 5,621,875 A | * | 4/1997 | Mason et al. | 715/234 |
| 5,818,361 A | * | 10/1998 | Acevedo | 341/23 |
| 5,860,073 A | | 1/1999 | Ferrel et al. | |
| RE36,704 E | | 5/2000 | Parker et al. | |
| 6,088,711 A | * | 7/2000 | Fein et al. | 715/269 |
| 7,154,480 B2 | | 12/2006 | Iesaka | |
| 7,453,439 B1 | | 11/2008 | Kushler et al. | |
| 7,561,145 B2 | | 7/2009 | Garside et al. | |
| 7,657,844 B2 | * | 2/2010 | Gibson et al. | 715/827 |
| 7,739,615 B2 | * | 6/2010 | Pearson | 715/773 |
| 7,831,923 B2 | * | 11/2010 | Keohane et al. | 715/773 |
| 8,146,016 B2 | * | 3/2012 | Himberger et al. | 715/825 |
| 8,347,221 B2 | * | 1/2013 | Griffin et al. | 715/773 |
| 2003/0132950 A1 | | 7/2003 | Surucu et al. | |

(Continued)

FOREIGN PATENT DOCUMENTS

| | | |
|---|---|---|
| WO | 2010034841 A2 | 4/2010 |
| WO | 2011066599 A1 | 6/2011 |

OTHER PUBLICATIONS

Ubuntucat, "The Pros and Cons of the Android Keyboard", found at http://www.psychocats.net/ubuntucat/the-pros-and-cons-of-the-android-keyboard/, Aug. 20, 2010, evidenced by the Internet Archive Wayback Machine http://web.archive.org/web/2010082408511/http://www.psychocats.net/ubuntucat/the-pros-and-cons-of-the-android-keyboard/, pp. 1-6.*

(Continued)

*Primary Examiner* — Omar Abdul-Ali
*Assistant Examiner* — Andrew Tank
(74) *Attorney, Agent, or Firm* — Shumaker & Sieffert, P.A.

(57) ABSTRACT

This disclosure is directed to techniques for text entry/modification using a touch-sensitive device. In one example, the techniques include presenting, by a touch-sensitive device, a graphical keyboard. The graphical keyboard includes at least one character image that represents at least one text character and that is selectable by a user to input the at least one text character. User input may be detected that indicates user selection of at least one formatting option associated with text that is presentable by the touch-sensitive device. A presentation of the at least one character image may be modified to display an indication of the selected formatting option.

15 Claims, 10 Drawing Sheets

(56) References Cited

U.S. PATENT DOCUMENTS

| | | | |
|---|---|---|---|
| 2006/0053387 | A1 | 3/2006 | Ording |
| 2006/0117067 | A1 | 6/2006 | Wright et al. |
| 2006/0132812 | A1* | 6/2006 | Barnes et al. ............... 358/1.11 |
| 2007/0013662 | A1* | 1/2007 | Fauth ........................... 345/168 |
| 2007/0097085 | A1 | 5/2007 | Iwatsuki |
| 2007/0236461 | A1* | 10/2007 | Griffin et al. ................ 345/169 |
| 2007/0300175 | A1 | 12/2007 | Lu |
| 2008/0036743 | A1 | 2/2008 | Westerman et al. |
| 2008/0195394 | A1 | 8/2008 | Francioli |
| 2008/0270896 | A1 | 10/2008 | Kristensson |
| 2008/0284744 | A1 | 11/2008 | Park et al. |
| 2008/0316183 | A1 | 12/2008 | Westerman et al. |
| 2009/0058815 | A1 | 3/2009 | Jeon et al. |
| 2009/0058823 | A1 | 3/2009 | Kocienda |
| 2009/0077464 | A1 | 3/2009 | Goldsmith et al. |
| 2009/0106827 | A1 | 4/2009 | Cerruti et al. |
| 2009/0216531 | A1* | 8/2009 | Yanagihara .................. 704/235 |
| 2009/0225034 | A1 | 9/2009 | Kida et al. |
| 2009/0231281 | A1 | 9/2009 | Whytock et al. |
| 2010/0020033 | A1 | 1/2010 | Nwosu |
| 2010/0060586 | A1 | 3/2010 | Pisula et al. |
| 2010/0069115 | A1* | 3/2010 | Liu ............................. 455/556.1 |
| 2010/0088625 | A1 | 4/2010 | Chen |
| 2010/0115159 | A1* | 5/2010 | Cookson ........................ 710/67 |
| 2010/0115448 | A1* | 5/2010 | Lysytskyy et al. ............ 715/773 |
| 2010/0125816 | A1* | 5/2010 | Bezos ........................... 715/863 |
| 2010/0169818 | A1* | 7/2010 | Hughes et al. ................ 715/773 |
| 2010/0238125 | A1 | 9/2010 | Ronkainen |
| 2010/0259482 | A1* | 10/2010 | Ball ............................. 345/168 |
| 2010/0265182 | A1 | 10/2010 | Ball et al. |
| 2010/0265183 | A1 | 10/2010 | Mail et al. |
| 2010/0306706 | A1* | 12/2010 | Gill et al. ...................... 715/839 |
| 2010/0315266 | A1 | 12/2010 | Gunawardana et al. |
| 2010/0323762 | A1 | 12/2010 | Sindhu |
| 2011/0074790 | A1 | 3/2011 | Fenn |
| 2011/0078560 | A1 | 3/2011 | Weeldreyer et al. |
| 2011/0078613 | A1* | 3/2011 | Bangalore ..................... 715/773 |
| 2011/0078614 | A1 | 3/2011 | Lee et al. |
| 2011/0154246 | A1 | 6/2011 | Oh et al. |
| 2011/0167375 | A1 | 7/2011 | Kocienda |
| 2011/0179372 | A1 | 7/2011 | Moore et al. |
| 2011/0221678 | A1 | 9/2011 | Davydov |
| 2011/0225536 | A1 | 9/2011 | Shams et al. |
| 2011/0231789 | A1 | 9/2011 | Bukurak et al. |
| 2011/0239150 | A1 | 9/2011 | Liao |
| 2011/0246878 | A1 | 10/2011 | Dowdell |
| 2011/0246927 | A1 | 10/2011 | Im |
| 2011/0255100 | A1 | 10/2011 | De Munck et al. |
| 2012/0011449 | A1 | 1/2012 | Sasson et al. |
| 2012/0017161 | A1 | 1/2012 | Hirshberg |
| 2012/0113026 | A1 | 5/2012 | Koch |
| 2012/0117501 | A1 | 5/2012 | Koch |
| 2012/0124469 | A1 | 5/2012 | Nakajima et al. |
| 2012/0231774 | A1 | 9/2012 | Blades |

OTHER PUBLICATIONS

Fearless_yakov "Can I use drop-down menus in Word for Mac'?", found at http://ask.metafilter.com/31294/Can-I-use-dropdown-menus-in-Word-for-Mac, Mar. 21, 2007, evidenced by the Internet Archive Wayback Machine http://web.archive.org/web/20070321131337/http://ask.metafilter.com/31294/Can-I-use-dropdown-menus-in-Word-for-Mac, pp. 1-3.*

Microsoft, "Quickly copy formatting with the Format Painter", evidenced by the Internet Archive Wayback Machine http://web.archive.org/web/20100821023109/http://office.microsoft.com/en-us/help/quickly-copy-formatting-with-the-format-painter-HA001054892.aspx, Aug. 21, 2010.*

Wollman, "Apple iWork for iPad", found at http://www.laptopmag.com/review/software/apple-iwork-for-ipad.aspx, Jul. 30, 2010, evidenced by the Internet Archive Wayback Machine http://web.archive.org/web/20100730072821/http://www.laptopmag.com/review/software/apple-iwork-for-ipad.aspx, pp. 1-8.*

Computerhope, "Use the Microsoft Word Format Painter to copy formatting", found at http://www.computerhope.com/tips/tip128.htm, Jun. 30, 2010, evidenced by the Internet Archive Wayback Machine http://web.archive.org/web/20100630060251/http://www.computerhope.com/tips/tip128.htm, p. 1.*

Oakley, et al., "Tilt to Scroll: Evaluating a Motion Based Vibrotactile Mobile Interface," Proceedings of the First Joint Eurohaptics Conference and Symposium on Haptic Interfaces for Virtual Environment and Teleoperator Systems, 2005, 10 pp.

Parikh, "Accelerometer Based Motion Gestures for Mobile Devices," CS297 Report, Department of Computer Science, San Jose State University, Spring 2008, 14 pp.

Wachs, et al., "A Holistic Framework for Hand Gestures Design," In Proc. of 2nd Annual Visual and Iconic Language Conference, San Diego, CA, Jul. 21-22, 2008, pp. 24-34.

U.S. Appl. No. 12/962,152, by Ronald Ho, filed Oct. 19, 2010.
U.S. Appl. No. 12/961,817, by Gabriel Cohen, filed Dec. 7, 2010.
U.S. Appl. No. 12/961,970, by Gabriel A. Cohen, filed Dec. 7, 2010.
Office Action from U.S. Appl. No. 12/961,817, dated Dec. 19, 2011, 24 pp.
Office Action from U.S. Appl. No. 13/249,766, dated Nov. 21, 2011, 23 pp.
Response to Office Action dated Nov. 21, 2011, from U.S. Appl. No. 13/249,766, filed Feb. 21, 2012, 11 pp.
Office Action from U.S. Appl. No. 12/961,970, dated Nov. 16, 2012, 28 pp.
Response to Office Action from U.S. Appl. No. 12/961,970, dated Nov. 16, 2012, filed Feb. 15, 2013, 12 pp.
Response to Office Action dated Dec. 19, 2011, from U.S. Appl. No. 12/961,817, filed Mar. 6, 2012, 11 pp.
Office Action from U.S. Appl. No. 12/961,817, dated Nov. 8, 2012, 21 pp.
Response to Office Action from U.S. Appl. No. 12/961,817, dated Nov. 8, 2012, filed Feb. 8, 2013, 13 pp.
Office Action from U.S. Appl. No. 12/961,817, dated May 16, 2013, 34 pp.
Final Office action from U.S. Appl. No. 12/961,970, dated Mar. 19, 2013, 32 pages.
Final Office action from U.S. Appl. No. 12/961,817, dated May 4, 2012, 25 pages.
Advisory Action from U.S. Appl. No. 12/961,817, dated Aug. 2, 2012, 2 pages.
Final Office action from U.S. Appl. No. 13/249,766, dated May 4, 2012, 25 pages.
Advisory Action from U.S. Appl. No. 13/249,766, dated Aug. 2, 2012, 2 pages.
Office action from U.S. Appl. No. 13/249,766, dated Nov. 13, 2012, 21 pages.
Responsive Amendment from U.S. Appl. No. 13/249,766, dated Jul. 5, 2012, 11 pages.
Responsive Amendment from U.S. Appl. No. 12/961,817, dated Jul. 5, 2012, 11 pages.

* cited by examiner

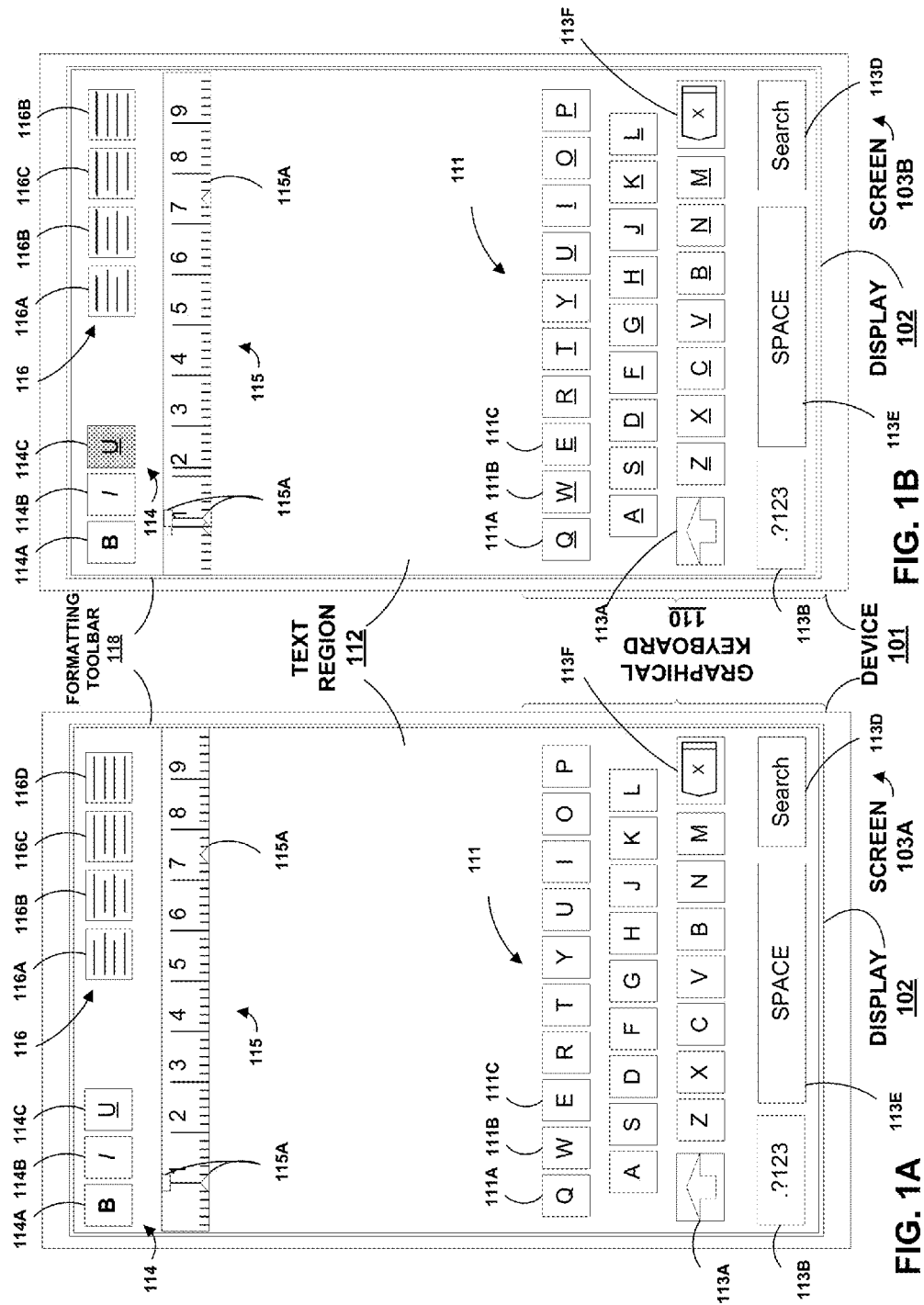

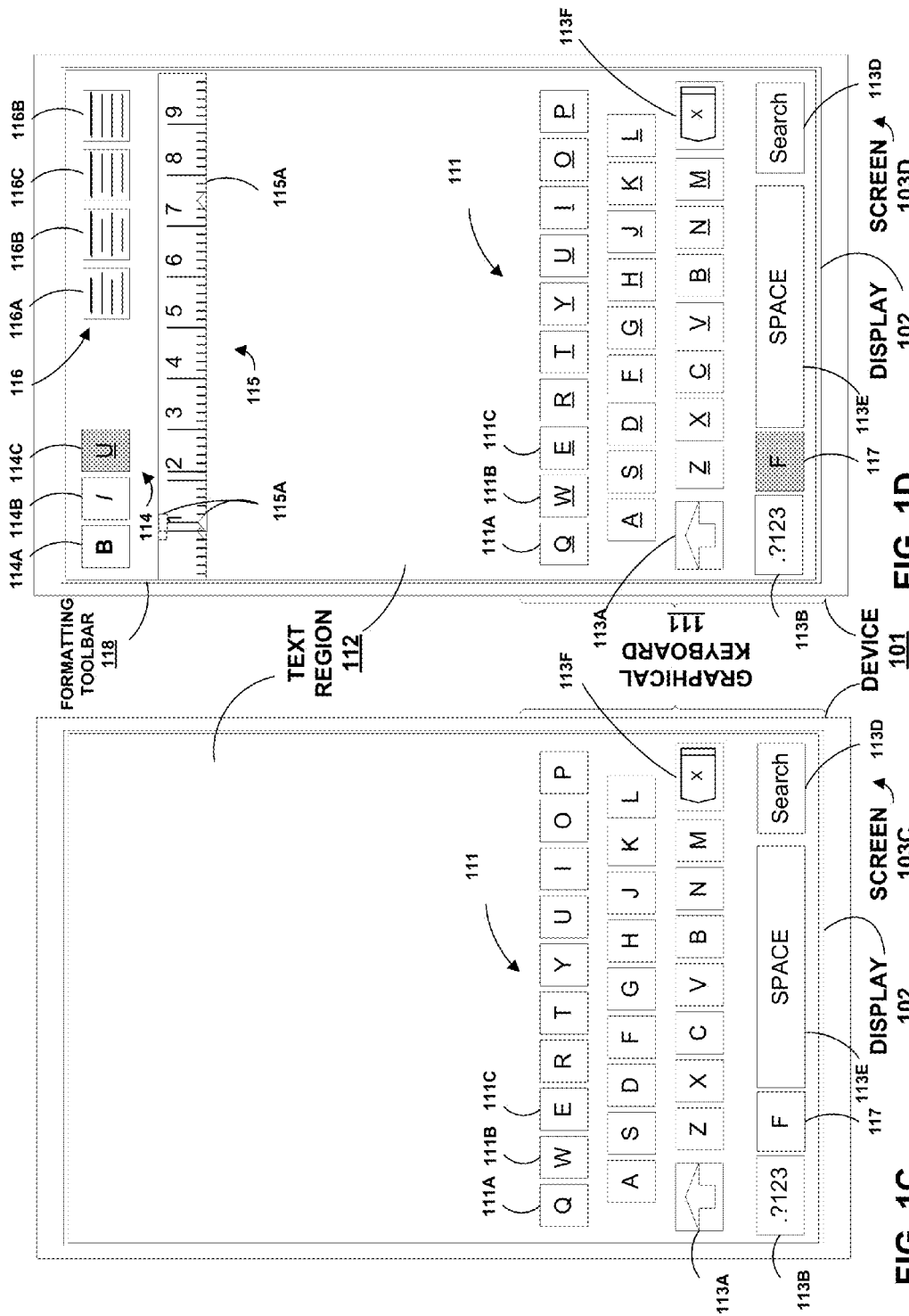

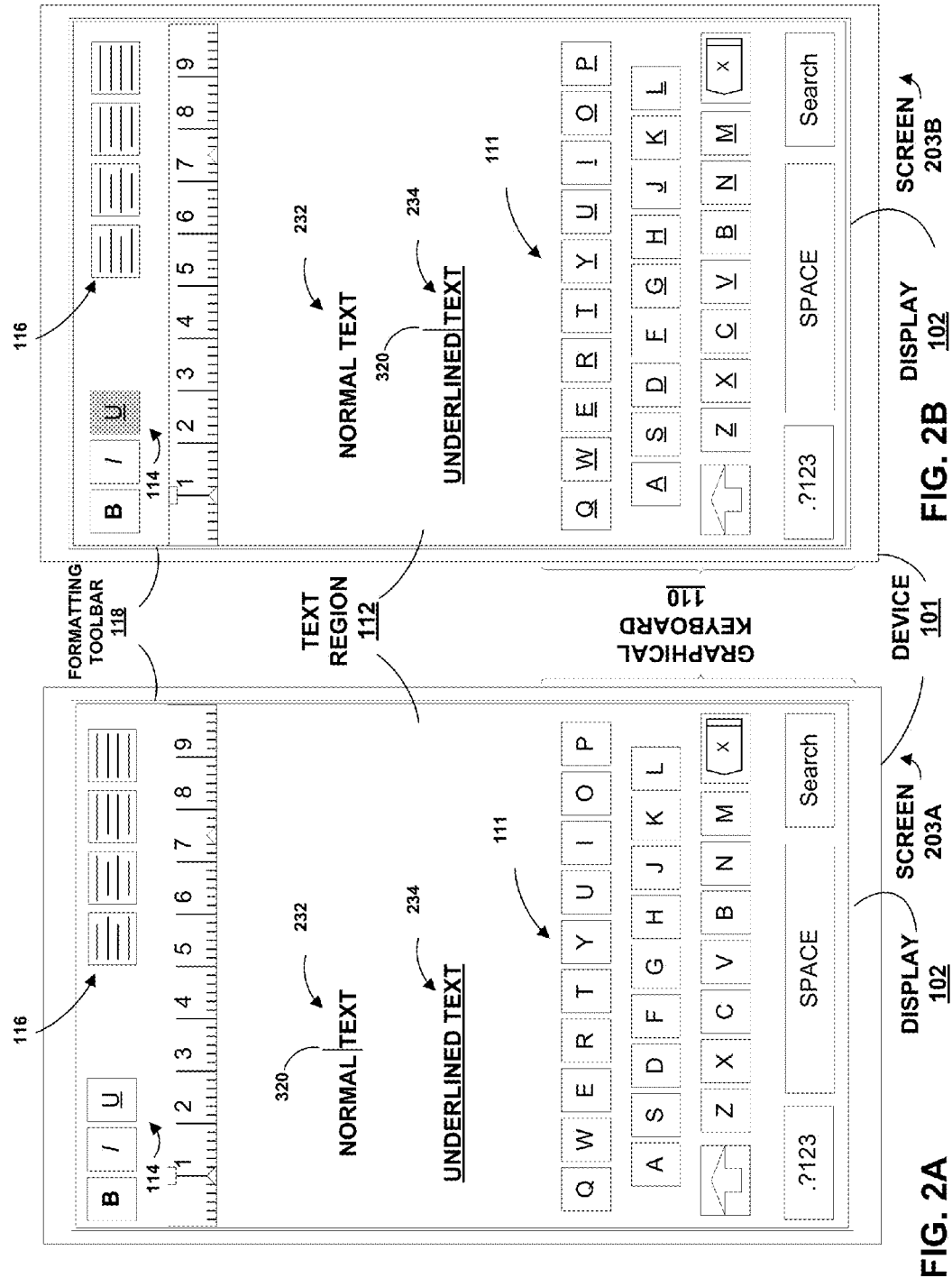

US 8,812,973 B1

MOBILE DEVICE TEXT-FORMATTING

This application is a continuation of U.S. application Ser. No. 12/961,970, filed Dec. 7, 2010, the entire content of which is incorporated herein by reference.

TECHNICAL FIELD

This disclosure is generally directed to the use of touch-sensitive devices, such as touch-screen devices.

BACKGROUND

Touch-sensitive devices such as mobile phones, music/video players, tablet computers, and the like have become increasingly desirable for consumers in recent years. Many such devices are configured to detect user touch to receive user input as opposed to more classical user input mechanisms such as external buttons, a keyboard, and/or a trackpad/mouse. Detection of user touch to receive user input enables devices to be smaller and/or conform to desired form factors, because other mechanisms for user input (e.g., input keys, keyboard, mouse, trackpad) are not needed. Detection of user touch as device input may also be desirable because it may more closely mimic user interaction with real world objects (e.g., flipping through a newspaper, book, stack of compact discs or digital video discs (DVDs)).

Known touch-sensitive devices may be configured to present a graphical keyboard using a display of the device. To enter text into the keyboard, a user may touch keys of the graphical keyboard that represent characters. For example, to type a "j" character, a user may touch an image of an icon presented on a display that depicts the character "j." A graphical keyboard may also include images of icons representing functional keys typically found on a classical keyboard, for example tab, spacebar, enter (return), or other functional keys.

Known applications (e.g., mobile device software) may provide a user with options for the editing or entry of text. For example, some touch-sensitive devices may provide a user with options to type characters (or modify existing text) in different text formats, for example in bold, italics, or underlined formats. Known touch sensitive device applications may further provide a user with options to select different text sizes (e.g., 10, 12, 14 point font), different fonts (e.g., Times New Roman, Calibri), different line spacing, or other formatting characteristics for text entry or modification. Such applications may provide a user with a button, pull-down menu, or other similar input mechanism presented using a display of the device to select different text-formatting options. A user may select one or more formatting options and enter text in the selected one or more formats. A user may further select, using various combinations of touch gestures detectable by the device, desired text to change formatting for the text. For example, a user may select (e.g., highlight) desired text, and select from among options as described above to change a format of the selected text (e.g., from bold to underlined).

SUMMARY

This disclosure is directed to techniques for improving a user experience when entering/modifying text using a touch-sensitive device. The techniques provided herein may provide for an improved indication to a user that the user has selected a formatting option and/or placed a cursor at or near text. The techniques of this disclosure may further provide a user with a greater variety of text-formatting options while minimizing an amount of touch-sensitive device display real estate to provide the greater variety of text-formatting options.

According to one example, a method is described herein. The method includes presenting, by a touch-sensitive device, a graphical keyboard, wherein the graphical keyboard comprises at least one character image that represents at least one text character and that is selectable by a user to input the at least one text character. The method further includes detecting user input that indicates user selection of at least one formatting option associated with text that is presentable by the touch-sensitive device, wherein the at least one formatting option represents a modification of presentation for textual content presentable by the touch-sensitive device. The method further includes modifying, by the touch-sensitive device, a presentation of the at least one character image of the graphical keyboard to display an indication of the selected formatting option.

According to another example, a touch-sensitive device is described herein. The touch-sensitive device includes a display module configured to present a graphical keyboard, wherein the graphical keyboard comprises at least one character image that represents at least one text character and that is selectable by a user to input the at least one text character. The touch-sensitive device further includes a sensor module configured to detect user input that indicates user selection of at least one formatting option associated with text presentable by the touch-sensitive device, wherein the at least one formatting option represents a modification of presentation for textual content presentable by the touch-sensitive device. The touch-sensitive device further includes means for modifying, by the touch-sensitive device, a presentation of the at least one character image of the graphical keyboard to reflect the user selection of the at least one formatting option indicated by the detected user input.

According to another example, an article of manufacture comprising a computer-readable storage medium is described herein. The computer-readable storage medium stores instructions that, when executed, cause a computing device to present, by the computing device, a graphical keyboard, wherein the graphical keyboard comprises at least one at least one character image that represents at least one text character and that is selectable by a user to input the at least one text character. The instructions further cause the computing device to detect user input that indicates user selection of at least one formatting option associated with text that is presentable by the touch-sensitive device. The at least one formatting option represents a modification of presentation for textual content presentable by the touch-sensitive device. The instructions further cause the computing device to modify presentation of the at least one character image of the graphical keyboard to display an indication of the selected formatting option.

According to another example, a method is described herein. The method includes receiving, by a touch-sensitive device, a first user input to select a formatting type from a plurality of formatting types, wherein the formatting type comprises a grouping of formatting options for text presentable by a display of the touch-sensitive device. The method further includes receiving, by the touch-sensitive device, a second user input indicating a transition between a first formatting option of the formatting type and a second formatting option of the formatting type. The method further includes formatting text presentable by the display of the touch-sensitive device according to the user-indicated transition to the second formatting option of the formatting type.

According to another example, an article of manufacture comprising a computer-readable storage medium is described herein. The computer-readable storage medium stores instructions configured to cause a computing device to receive a first user input to select a formatting type from a plurality of formatting types, wherein the formatting type comprises a grouping of formatting options for text presentable by a display of a touch-sensitive device. The instructions further cause the computing device to receive a second user input indicating a transition between a first formatting option of the formatting type and a second formatting option of the formatting type. The instructions further cause the computing device to format text presentable by the display of the touch-sensitive device according to the user-indicated transition to the second formatting option of the formatting type.

According to another example, an article of manufacture comprising a computer-readable storage medium is described herein. The computer-readable storage medium stores instructions configured to cause a computing device to present a graphical keyboard comprising at least one character image that represents at least one text character and that is selectable by a user to input the at least one text character. The instructions further cause the computing device to detect user input to select a formatting option associated with text that is presentable by the touch-sensitive device. The instructions further cause the computing device to replace, in response to the detected user input, the graphical keyboard with a formatting option keyboard that comprises at least one image representing at least one formatting option that is selectable by a user to select the formatting option.

The details of one or more examples of this disclosure are set forth in the accompanying drawings and the description below. Other features, objects, and advantages of the disclosure will be apparent from the description and drawings, and from the claims.

BRIEF DESCRIPTION OF DRAWINGS

FIGS. 1A and 1B are conceptual diagrams illustrating one example of a touch-sensitive device that may be configured to enable user selection of formatting options for text consistent with the techniques of this disclosure.

FIGS. 1C and 1D are conceptual diagrams that illustrate one example of a touch-sensitive device that may be configured to enable user selection of formatting options for text consistent with the techniques of this disclosure.

FIGS. 2A and 2B are conceptual diagrams illustrating another example of a touch-sensitive device that may be configured to enable user selection of formatting options for text consistent with the techniques of this disclosure.

DETAILED DESCRIPTION

Figure 3:
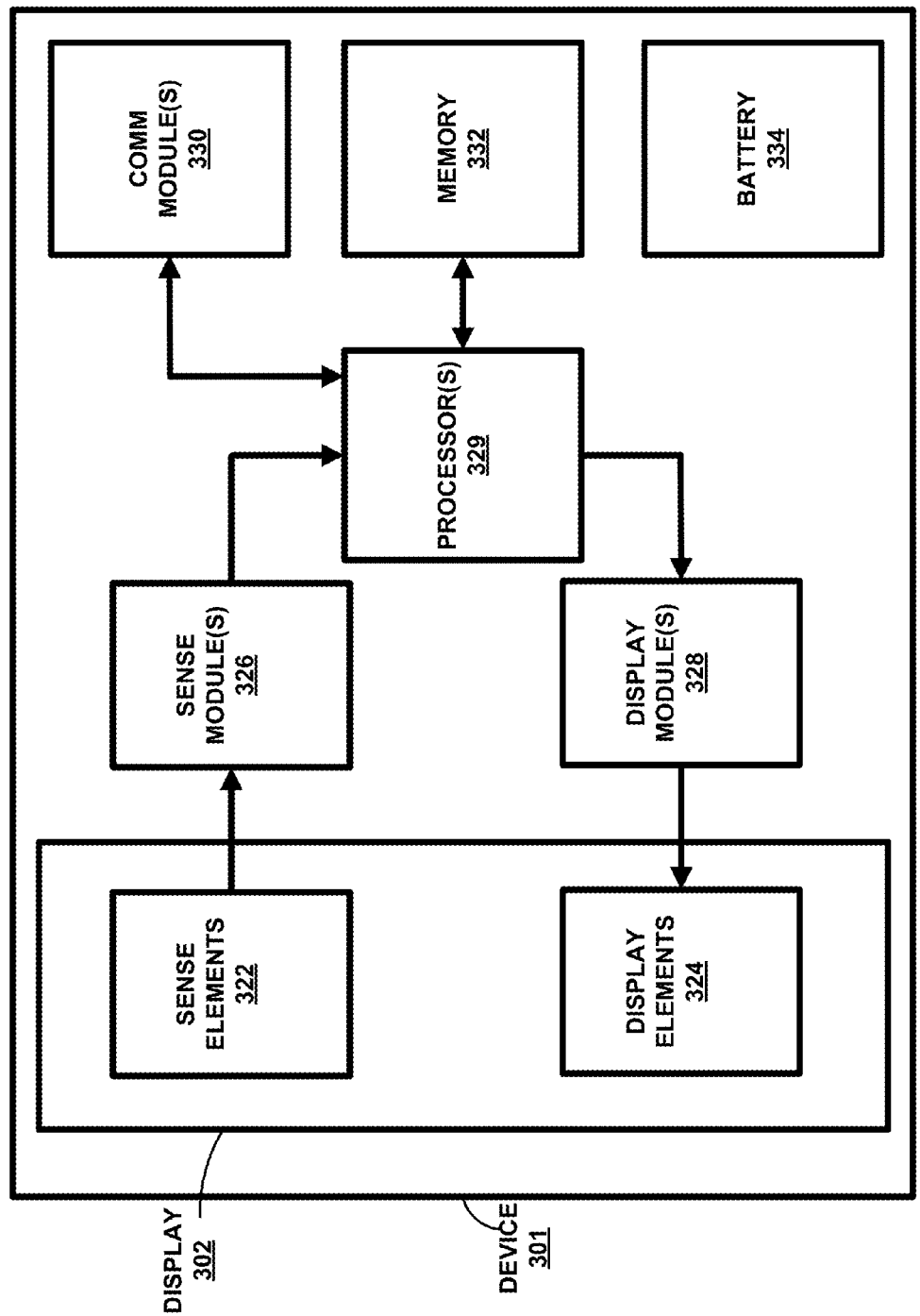
FIG. 3 is a block diagram illustrating one example of components that may be included in a touch-sensitive device that may be operated according to the techniques of this disclosure.

FIGS. 1A and 1B are conceptual diagrams illustrating one example of a touch-sensitive device 101 that may be configured to enable user selection of formatting options for text consistent with the techniques of this disclosure. FIGS. 1A and 1B show the same device 101 depicted twice, in order to illustrate differences between device screens 103A, 103B (e.g., images portrayed using display 102 of device 101) consistent with the techniques of this disclosure.

As shown in FIGS. 1A and 1B, device 101 includes a display 102. Device 101 may be configured to operate display 102 to portray images to a user. Device 101 may further be configured to detect user interaction with display 102 and/or other surfaces of device 101. For example, device 101 may be configured to detect a user's finger or stylus at or near a surface of display. In response to detection of user input, device 101 may be configured to execute device 101 operations. For example, in response to detection of user input, device 101 may modify one or more images presented using display 102, such as one or more images of characters, or character images, that are included in a graphical keyboard.

The example depicted in FIGS. 1A and 1B shows a device 101 that is a mobile phone (e.g., smartphone) or tablet computing device. In other examples not depicted, device 101 may be a desktop, laptop, netbook, or other form of computing device. Device 101 may or may not be configured to detect user input at or near display 102.

Device 101 may be configured to detect user entry of text. In some examples, device 101 may be configured to detect text entry using a graphical keyboard 110 presented by at least a portion of display 102. In the example of FIGS. 1A and 1B, a graphical keyboard 110 is presented by display 102, at a lower portion of display, and a text region 112 arranged above graphical keyboard 110. Text region 112 may display images of text (not shown in the FIG. 1 example) for a user, e.g., text of a document or text a user has entered.

Graphical keyboard 110 may include plurality of keys 111. Keys 111 include at least one image that represents one or more text characters. These images may be referred to as character images. Keys 111 may be selectable by a user to provide input to device 101. In some examples, keys 111 may represent individual letters (e.g., for Latin languages such as English or French) and/or words (e.g., for word-based character languages such as Mandarin Chinese). Key 111 icons may each define a region of display 102 which a user may touch (e.g., bring a finger or stylus near or in contact with) in order to input a particular character. For example, key 111B defines a region of display 102 that represents the character "W." Device 101 detection that a user has touched a region at or near key 111B may be received as a "W" character by device 101. In one example, device 101 detection that a user has touched the "W" key may cause device 101 to present a "W" character at display 102, for example in text region 112 in the example of FIGS. 1A and 1B.

Graphical keyboard 110 shown in FIGS. 1A and 1B is a QWERTY keyboard often used for the English language. In other examples, graphical keyboard 110 may represent various other icon combinations of keyboard formats specifically for English or for other languages. For example, graphical keyboard 110 may include icons of English language characters according to an alternative keyboard layout such as a Dvorak Simplified Keyboard layout. In other examples, a graphical keyboard may be presented in a QWERTZ layout that is widely used in Germany and much of Central Europe. Any other keyboard, whether directed towards a Latin character-based language or non Latin character-based language (e.g., Arabic, Russian, Chinese, Japanese, Korean), may be presented and is consistent with the techniques of this disclosure.

As also depicted in FIGS. 1A and 1B, graphical keyboard 110 may include one or more non-character keys 113A-113F (collectively "keys 113") that include icons that perform functions of device 101 when touched by a user. For example, graphical keyboard 110 of FIGS. 1A and 1B includes a shift key 113A, a numeric keyboard key 113B (e.g., to switch to an alternate keyboard for entry of numeric characters and/or various punctuation characters), a "search" key 113D (e.g., that initiates a search based on text of text region 112), a spacebar key 113E, and an enter key 113F. When editing or entering text, shift key 113A may be touched to cause user entry of a character to be capitalized or otherwise modified from a standard form. A spacebar key may be touched by a user to input a space character. An "enter" or "return" key 113F as shown in FIGS. 1A and 1B may cause a text entry cursor to advance to a new line. Graphical keyboard 110 may include any number of functional key icons instead of or in addition to those depicted in FIGS. 1A and 1B without departing from the scope of this disclosure.

As also shown in the example of FIGS. 1A and 1B, display 102 further presents a formatting toolbar 118. In the example of FIGS. 1A and 1B, formatting toolbar 118 is presented above text region 112. In other examples, formatting toolbar 118 may instead be in a different region of display 102. In still other examples, display 102 may present multiple formatting toolbars 118, and/or individual icons, pull-down mechanisms or other mechanisms for touch-based user input of formatting options. Furthermore, in still other examples, graphical keyboard 110, text region 112, and/or formatting toolbar 118 may be presented in any region of display 102. Also, in some examples, graphical keyboard 110, text region 112, and/or formatting toolbar 118 may be presented standalone by display 102, e.g., not in a toolbar specifically for formatting options.

As also shown in the example of FIGS. 1A and 1B, formatting toolbar 118 presents a number of icons that represent selectable formatting options for text. For example, at an upper left of screens 103A, 103B, three user-selectable rich text-formatting icons 114 are presented that represent bold 114A, italics 114B, and underlined 114C rich text-formatting options. Device 101 detection of a user touch at regions defined by icons 114 may result in selection of that formatting option for text. In some examples, a user may select multiple formatting options represented by icons 114 standalone or in combination simultaneously (e.g., to cause text to appear both bold and underlined).

Formatting toolbar 118 further includes paragraph alignment formatting icons 116. Paragraph formatting icons 116 are user-selectable icons that represent left aligned 116A, center aligned 116B, right aligned 116C, and justified 116D alignment paragraph formatting options.

Formatting toolbar 118 further includes ruler icon 115. Ruler icon 115 may provide a user with a reference for determining margins, paragraph tabs, or other similar formatting options for text. Formatting toolbar further includes markers 115A. Markers 115A may be adjustable by a user (e.g., by sliding a finger or stylus left or right on display 102) to set margins, paragraph tabs, or other text-formatting options.

In the example device screen 103A of FIG. 1A, graphical keyboard 110 is shown with keys 111, 113 that each include at least one indication of device functionality, for example letters (e.g., a "W" character 111B) or other characters (e.g., an arrow for "shift" functionality 113A) that indicate an operation to be performed in response to detection of a user touch at one or more regions of display 112 represented by a key 111, 113. According to this example, keys 111 representing letters of the alphabet are displayed with standard formatting (e.g., not in bold, italics, underlined, strikethrough, or any other rich text-formatting).

As depicted in screen 103B at FIG. 1B, a user has selected a formatting option. According to this example, a user has selected a underlined formatting option using icon 114C of formatting toolbar 118. For a typical device, user selection of icon 114C may cause text to be entered by a user, user selected text presented at text region 112, and/or all text presented at text region 112 to be presented in an underlined format.

As shown in the example screen 103B at FIG. 1B, according to one aspect of the techniques of this disclosure, in addition to modification of text in response to device 101 detection of user selection of the formatting option represented by icon 114C, images of icons 111 presented by graphical keyboard 110 are modified in response to device 101 detection of a user-selected formatting option. In the FIG. 1B example, characters presented by icons 111 that represent text character entry are modified to be presented in underlined format.

A user experience when attempting to input and/or modify text utilizing touch-sensitive device detection for detection of user input may be complex, confusing, and/or cumbersome. For example, it may be difficult for a user to accurately select text, or a formatting option, or even to accurately input text characters using graphical keyboard 110. As such, it may be desirable to reduce ambiguity for more complex tasks, such as the entry or modification of text. Thus, it may be desirable to make it more apparent to a user what formatting options the user has selected. As such, in one aspect, the techniques of this disclosure provide a user with a readily apparent indication of selected formatting options by modifying at least one key 111, 113 of a graphical keyboard 110 presented by a device display 102. In addition, the techniques of this disclosure may not require any additional space on display 102 to convey an improved indication of selected formatting options.

FIGS. 1C and 1D are conceptual diagrams that illustrate one example of a touch-sensitive device 101 that may be configured to enable user selection of formatting options for text consistent with the techniques of this disclosure. FIG. 1C shows one example of a screen 103C of a touch-sensitive device. Screen 103C is similar to screens 103A and 103B depicted in FIGS. 1A and 1B, respectively. Screen 103C differs from screens 103A and 103B in that graphical keyboard 111 includes an additional key, formatting toggle key 117. Screen 103C also differs from screens 103A and 103B in that screen 103C does not include formatting toolbar 118. Instead, screen 103C includes a larger text region 112 than screens 103A and 103B.

Formatting toggle key 117 may be selectable by a user to cause a formatting toolbar 118 to appear on display 102. For example, as shown in FIG. 1D, a user has selected key 117 (e.g., by device 101 detection of user touch), and in response, formatting toolbar 118 is displayed above (with respect to the page of FIG. 1D) text region 112. If the user again actuates key 117 (e.g., by device 101 detection of touch), formatting toolbar 118 may disappear, and again provide a user with a larger text region 112 on display 102 (e.g., as shown in FIG. 1C).

The techniques depicted in FIGS. 1C and 1D may be advantageous, because when a user is merely viewing or entering text, the user may not need to select formatting options for text. As such, the user may be provided with a larger viewing area for the reading/entering of text than if formatting options were present as shown in FIGS. 1A and 1B. These techniques may be specifically advantageous for touch-sensitive devices 101 that have a relatively small display area, e.g., smartphones or other similarly sized highly portable devices.

FIGS. 2A and 2B are conceptual diagrams that illustrate one example of a device 101 configured to operate according to the techniques of this disclosure to detect user input using an alternative mechanism in comparison to the example of FIGS. 1A and 1B. According to the example of FIGS. 2A and 2B, a formatting option may be selected by a user by the user placing a cursor at or near text of a particular formatting. As shown at screen 203A at FIG. 2A, text region 112 of display 102 presents both "normal" (e.g., with standard formatting) text 122 and "underlined" (e.g., formatted text) text 124. According to screen 203B at FIG. 2B, a user has caused (e.g., by touch-based placement or the use of directional arrows, a mouse, or other input) cursor 120 at or near normal text 122. As also shown in this example, keys 111 of graphical keyboard 110 include an image of characters displayed in a standard font, consistent with cursor 120 placement.

As shown at screen 203B at FIG. 2B, a user has placed cursor 320 at or near underlined text 232. As also depicted according to this example, in response to placement of cursor 320, keys 111 of graphical keyboard 110 include images of characters displayed in an underlined format. According to the example of FIGS. 2A and 2B, a user may be readily informed that the user has indicated a formatting transition from standard to non-standard text format. This technique may be advantageous for a number of reasons. A user may quickly tell that the user has changed formatting options. The user may be therefore prevented from proceeding to type text or modify text in an undesired format when the user accidentally selected a formatting option (e.g., selected a formatting option as show in the example of FIGS. 1A and 1B). Also, by identifying formatting changes by modification of a graphical keyboard, a user may be quickly and readily informed that the user has inadvertently modified cursor placement (e.g., by accidentally bumping a portion of display 102). Third, where the user has successfully modified a formatting option by either of the techniques depicted in FIGS. 1A, 1B 2A, and 2B, successful user input may be readily identifiable as well.

FIGS. 2A and 2B are merely one example of device 101 detection of user input based on cursor 320 placement. In other examples, instead of a user transitioning between standard and non-standard formatting options, a user may instead transition between different non-standard formatting options (e.g., between bold and italics). In addition, in some examples a graphical keyboard 110 may be modified in response to user selection of other formatting options. For example, as described with respect to FIGS. 4A and 4B, a graphical keyboard 110 may be modified to reflect user selection of a paragraph formatting option. In other examples not depicted herein, a graphical keyboard 110 may be modified based on user selection of other formatting options, non-limiting examples of which include: paragraph line spacing, before and after paragraph spacing, font (e.g., Times New Roman), font size (e.g., 12 pt font), font color (e.g., red, blue) margins (e.g., with respect to a ruler 115 as shown in FIGS. 1A and 1B), paragraph tabs (e.g., also with respect to ruler 115), and other similar formatting characteristics may cause a corresponding modification of a graphical keyboard 110 without exceeding the scope of this disclosure.

FIG. 3 is a block diagram that illustrates one example arrangement of a device 301 that may be configured to operate according to the techniques of this disclosure. As shown in FIG. 3, device 301 includes a display 302. Display 302 is configured to present images to a user. Display 302 is also configured to detect user interaction with display 302, by bringing a finger or stylus in contact with or in proximity to display 302. As also shown in FIG. 3, display 302 includes one or more display elements 324 and one or more sense elements 322. Display elements 324 are presented at or near a surface of display 302 to cause images to be portrayed by display 302. Examples of display elements 324 may include any combination of light emitting diodes (LEDs), organic light emitting diodes (OLED), liquid crystals (liquid crystal (LCD) display panel), plasma cells (plasma display panel), or any other elements configured to present images by a display. Sense elements 322 may also be presented at or near a surface of display 302. Sense elements 322 are configured to detect when a user has brought a finger or stylus in contact with or proximity to display 302. Examples of sense 322 elements may include any combination of capacitive, resistive, surface acoustic wave, strain gauge, optical imaging, dispersive signal (mechanical energy in glass detection surface that occurs due to touch), acoustic pulse recognition (vibrations caused by touch), or coded LCD (Bidirectional Screen) sense elements, or any other component configured to detect user interaction with a surface of device 201.

Device 301 may further include one or more circuits, software, or the like to interact with sense elements 322 and/or display elements 324 to cause device 301 to display images to a user and to detect user interaction with display 302 according to the techniques of this disclosure. For example, device 301 includes display module 328. Display module 328 may communicate signals to display elements 324 to cause images to be presented by display 302. For example, display module 328 may be configured to communicate with display elements 324 to cause the elements to emit light of different colors, at different frequencies, or at different intensities to cause a desired image to be presented by display 302.

Device 301 further includes sense module 326. Sensor module 326 may receive signals indicative of user interaction with display 302 from sense elements 322, and process those signals for use by device 301. For example, sensor module 326 may detect when a user has made contact with display 302, and/or when a user has ceased making contact (removed a finger or stylus) with display 302. Sensor module 326 may further distinguish between different types of user contact with display 302. For example, sensor module 326 may distinguish between a single touch gesture (one finger or one stylus), or a multi-touch gesture (multiple fingers or styli) in contact with display 302 simultaneously. In other examples, sensor module 326 may detect a length of time that a user has made contact with display 302. In still other examples, sensor module 326 may distinguish between different gestures, such as a single-touch gesture, a double or triple (or more) tap gesture, a swipe (moving one or more fingers across display), a circle (lasso) on display, or any other gesture performed at or near display 202.

As also shown in FIG. 3, device 301 includes one or more processors 329, one or more communications modules 330 (hereinafter communications module 330), one or more memories 332 (hereinafter memory 332), and one or more batteries 334 (hereinafter battery 344). Processor 329 (hereinafter referred to as processor 329) may be coupled to sensor module 326 to control detection of user interaction with display 302. Processor 329 may further be coupled to display module 38 to control the display of images by display 302. Processor 329 may control the display of images by display 302 based on signals indicative of user interaction with display 302 from sensor module 336, for example when a user selects a key (e.g., key 111 in the FIG. 1 example) of a graphical keyboard (e.g., graphical keyboard 110 depicted in FIG. 1), an entered text character or word may be reflected on display 302.

Processor 329 may further be coupled to memory 332 and communications module 330. Memory 332 may include one or more of a temporary (e.g., volatile memory) or long term (e.g., non-volatile memory such as a computer hard drive) memory component. Processor 329 may store data used to process signals from sense elements 322, or signals communicated to display elements 324 to control functions of device 301. Processor 329 may further be configured to process other information for operation of device 301, and store data used to process the other information in memory 332.

Processor 329 may further be coupled to communications module 330. Communications module 330 may be a device configured to enable device 301 to communicate with other computing devices. For example, communications module 330 may be a wireless card, Ethernet port, or other form of electrical circuitry that enables device 301 to communicate using a network such as the Internet. Using communications module 330, device 301 may communicate using a cellular network (e.g., a 3G network), a local wireless network (e.g., a Wi-Fi® network), or a wired network (Ethernet network connection). Communications module 330 may further enable other types of communications, such as Bluetooth communication.

In the example of FIG. 3, device 301 further includes one or more batteries 334. In some examples in which device 301 is a portable device (e.g., cellphone, laptop, smartphone, netbook, tablet computer, etc.), device 301 may include battery 334. In other examples in which device 301 is a non portable device (e.g., desktop computer, television display), battery 334 may be omitted from device 301. Where included in device 301, battery 334 may power circuitry of device 301 to allow device 301 to operate in accordance with the techniques of this disclosure.

The example of FIG. 3 shows sensor module 326 and display module 328 as separate from processor 329. In some examples, sensor module 326 and display module 328 may be implemented in separate circuitry from processor 329 (sensor module 336 may be implemented separate from display module 328 as well). However, in other examples, one or more of sensor module 326 and display module 328 may be implemented using software stored in memory 332 and executable by processor 329 to implement the respective functions of sensor module 326 and display module 328. Furthermore, the example of FIG. 3 shows sense element 322 and display elements 324 as formed independently at or near display 302. However, in some examples, one or more sense elements 322 and display elements 324 may be formed of arrays including multiple sense and display elements, which are interleaved in display 302. In some examples, both sense 322 and display 324 elements may be arranged to cover a majority of a surface of display 301, such that images may be displayed and user interaction detected across at least a majority of display 302.

Figure 4:
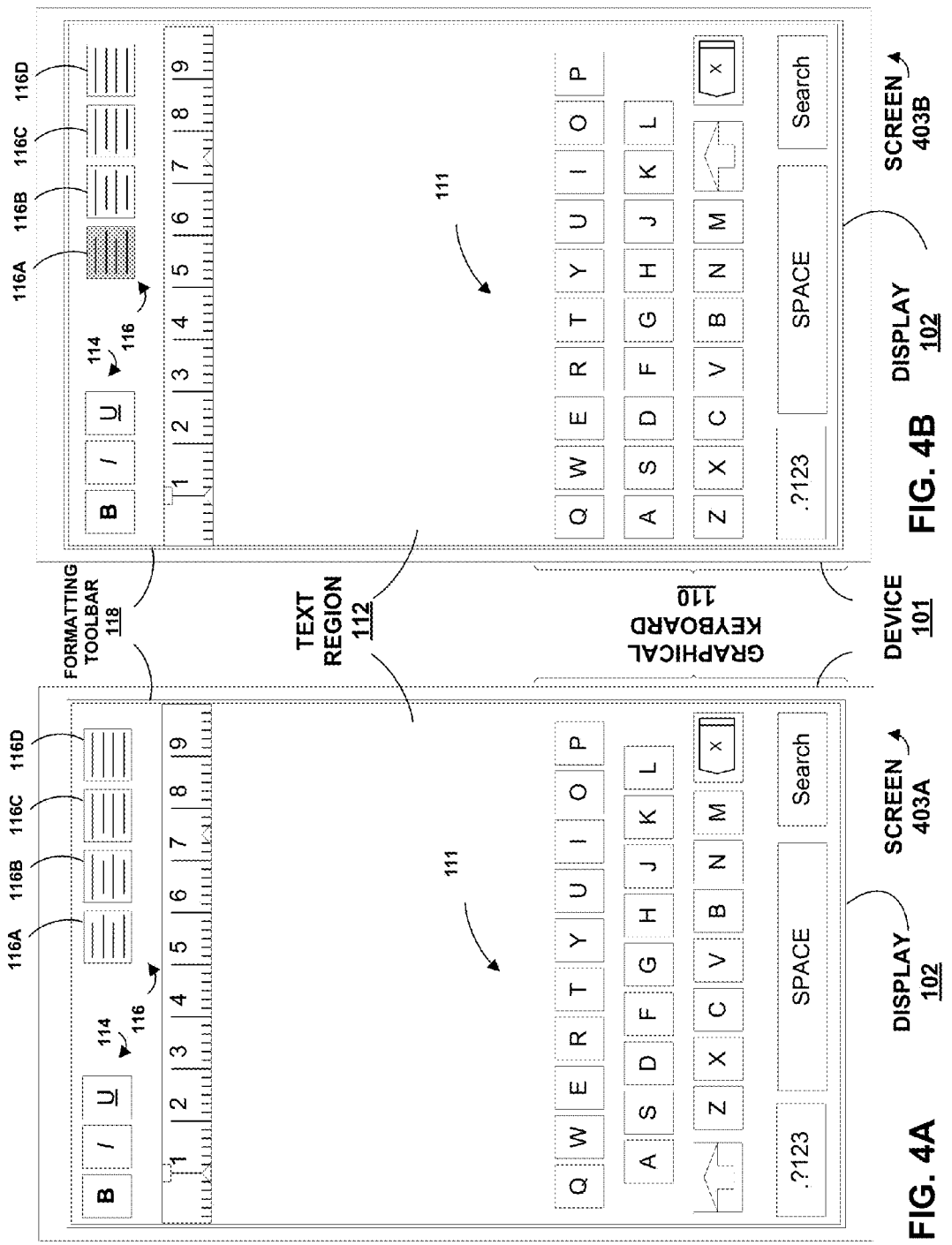
FIGS. 4A and 4B are conceptual diagram illustrating another example of a touch-sensitive device that may be configured to enable user selection of formatting options for text consistent with the techniques of this disclosure.

FIGS. 4A and 4B are conceptual diagrams that illustrates one example of a device 101 configured to operate according to the techniques of this disclosure. The example shown in FIGS. 4A and 4B re similar to the example shown in FIGS. 1A and 1B, where screen 403A at FIG. 4A shows a graphical keyboard 110 that includes keys 111 with images of characters presented in standard formatting. At screen 403B at FIG. 4B, a user has a selected a left aligned paragraph formatting option by selection of icon 116A. As also shown at screen 403B, icons 111 of graphical keyboard 110 are displayed to reflect the selected formatting option. At screen 403B, a location of keys 111 of keyboard 110 have been modified to reflect the selected left aligned formatting option. Keys 111 have been moved to the left, so that the leftmost keys of each row of graphical keyboard 110 are aligned with a left edge of display 102. As such, graphical keyboard 110 may readily identify a user that the user has inadvertently or intentionally selected the left aligned formatting option. In other examples not depicted in FIGS. 4A and 4B, the left aligned formatting option may be selected based on user placement of a cursor at or near text of text region 112 that is left-aligned, as discussed above with respect to FIGS. 2A and 2B.

The examples of graphical keyboard 110 modification to reflect detected user selection of one or more formatting options depicted in FIGS. 1A, 1B, 2A, 2B, and 4A, 4B are merely a few examples consistent with the techniques of this disclosure. In another example, device 101 may detect that a user has selected a font size for text. In response, device 101 may cause images of graphical keyboard 110 icons (keys) 111 to present larger or smaller characters identifying the key. In another example, a user may select a particular font, for example a Times New Roman font. In response device 101 may cause graphical keyboard keys to present characters in the selected font.

In another example, a user may select a margin for a paragraph or document (e.g., 1 inch margin). In response, keys of graphical keyboard may be moved to the right or left and/or re-shaped (e.g., to appear taller or shorter). In another example, a user may select a particular line spacing for a paragraph or document (e.g., single, 1.5, double line spacing). In response, graphical keyboard 110 may be modified to move rows of keys closer together (e.g., vertically) to reflect closer (single) or further (double) spacing. The same response may apply for before or after spacing for a paragraph (e.g., the keys of graphical keyboard 110 may be collectively moved up or down in response).

In another example, where a user has selected a tab formatting option (e.g., tab for the first line of one or more paragraphs), a first row (e.g., topmost) of graphical keyboard keys may be moved to the right and or re-shaped, while keys of second and third rows of keyboard 110 remain with the same position and/or shape. In another example, user selection of a font color may cause a corresponding change in a color of text presented for keys 111 and/or a background (fill) of keys 111. In still another example, user selection of highlighting (e.g., to enable highlighting and/or a color of highlighting) may cause a background or fill of keys 111 of graphical keyboard to change color.

The formatting options described herein that may be selected to cause a corresponding change in one or more images (e.g., keys 111) of a graphical keyboard 110 are merely provided for exemplary purposes and are intended to be non-limiting. Any formatting option for text, paragraphs, and/or documents that may be selected by a user may result in a modification to at least one feature of a graphical keyboard 110 without departing from the scope of the techniques described herein.

FIGS. 5A-5C are conceptual diagrams that illustrate one example of a mechanism for detecting user selection of a formatting option consistent with the techniques of this disclosure. The example of FIGS. 5A-5C show three screens 503A, 503B, and 503C of device 101. Like the examples of FIGS. 1A-1B, screens 503A-503C include a formatting toolbar 518. However, unlike FIGS. 1A-1B, formatting toolbar 518 includes a number of icons that represent different formatting option types 544, 546, 548, 550 as opposed to icons that directly represent selection of a particular formatting option. A formatting option type as described herein may refer to any grouping of formatting options selectable by a user for the entry or modification of text.

According to the example of FIGS. 1A-1B, formatting toolbar 118 enables a user to directly select a bold formatting option by selecting icon 114A. In contrast, formatting toolbar 518 enables a user to select a rich text-formatting type by selecting icon 544, which may represent a number of different rich text-formatting options, for example bold, italics, and underlined formatting options.

According to the example of FIG. 5A-5C, a user may select between different formatting options that correspond to a particular formatting type by performing a directional gesture at display 502. For example, a different formatting options may be selected by device 501 detection of a user movement or swipe (e.g., swipe left to right, right to left, or up and down). At screen 503A (FIG. 5A), a bold text-formatting option is selected. Also, screen 503A also shows device 501 detection of a right to left swipe at or near display 502. The swipe shown at 503A may cause a second screen, screen 503B (FIG. 5B) to be shown at display 102. Screen 503B may allow a user enter/modify text in an italics formatting option. Another user swipe at screen 503B may cause a third screen, screen 503C to be shown at display 102. Screen 503C (FIG. 5C) may allow a user to enter/modify text according to an underlined formatting option.

Although not shown in FIGS. 5A-5C, in some examples screens 503A-503C may include one or more indications of a formatting option selected by swiping. For example, rich text icon 544 may include one or more indications (e.g., one or more icons) of a formatting option selected according to detected user swipes. In other examples, detection of a user swipe to select a formatting option may cause a corresponding change to presentation of a graphical keyboard 110 presented using display 102. For example, as shown in FIG. FIGS. 5A-5C, detection of user swipes to select different formatting options may cause graphical keyboard 110 to transition between the display of keys 111 in bold (screen 503A), italics (screen 503B), and underlined (screen 503C) formats.

The techniques depicted in FIGS. 5A-5C may be advantageous, because without providing individual icons (or pull-down menus, or similar mechanisms) for each formatting option available for toolbar 518 (as shown in FIGS. 1A-1B, for example), a single formatting type icon (e.g., rich text icon 544) may represent a number of different formatting options. As such, a user may be provided with many more options for toolbar 518 while consuming the same or similar amount of display 502 real estate as toolbar 118 depicted in FIGS. 1A-1B. In one example, consumed display screen real estate may further be reduced by allowing a formatting toolbar to be toggled on or off, e.g., by a formatting toggle key as illustrated in FIGS. 1C and 1D and described above. Furthermore, by modifying presentation of graphical keyboard 110 in response to detection of user selection of a formatting option as described above with respect to FIGS. 1A, 1B, 2A, 2B, and 4A, 4B, a user may be readily identified of a formatting option selection, without consuming additional real estate on display 502.

FIGS. 5A-5C merely illustrates some examples of formatting option types that may be included consistent with the techniques of this disclosure. For example, toolbar 518 includes icons that represent rich text 544, alignment (e.g., paragraph alignment: right, center, left, justified) 546, font size (e.g., 12 point font) 548, and font color 550. Formatting options may be selected as described with respect to FIGS. 5A-5C according to any formatting type, or combination of formatting options. For example, a formatting option may allow a user to select (e.g., by detection of one or more swipes) from different fonts, paragraph formatting options, line formatting options, or any other like grouping of formatting options. Formatting types as described with respect to FIGS. 5A-5C may include a grouping of any combination of related or unrelated formatting options. For example, a formatting type may include a number of rich text-formatting options, as well as font or font size options according to a single formatting type grouping. Accordingly a user may execute multiple swipes to switch between the different formatting options according to the defined formatting type.

In still other examples, device 101 may be configured to enable a user to define one or more formatting types. A user may transition between formatting options of the defined formatting types as shown in FIGS. 5A-5C. For example, a user may define a first formatting type as include Bold, 12 point font, and double spaced paragraph. The user may define a second formatting type to include Underlined, 16 point font, and single spaced paragraph formatting options. According to this example, a user may transition between multiple formatting options pre-defined by a user using a swipe or other input mechanism as shown in FIGS. 5A-5C.

In another example, device 101 may not enable a user to define and/or select a formatting type that is selectable to determine a formatting option transition as a result of a directional user gesture as described above. According to this example, formatting options that may be selected by a directional user gesture may be pre-set. For example, device 101 may be configured to only enable transition between rich text formatting options (e.g., bold, italics, and underlined) using detection of directional gestures, while enabling user selection of other formatting options by other mechanisms such as selectable keys, pull-down menus, and/or the like.

For some text entry/modification software applications, a user may be provided with an ability to transition between different text views by horizontally or vertically swiping at a display surface. For example, a user may transition between different pages of a document, or different documents altogether, based on device 101 detection of a user swipe. In order to maintain such functionality, in one example, device 101 may be configured to execute different functionality based on what region of display 102 a user swipe is detected. For example, if device 101 detects a user swipe at or near text region 112 of display 102, a different document page or different document may be displayed in response. If device 101 detects a user swipe at or near graphical keyboard 110, a different formatting option may be selected.

Figure 5:
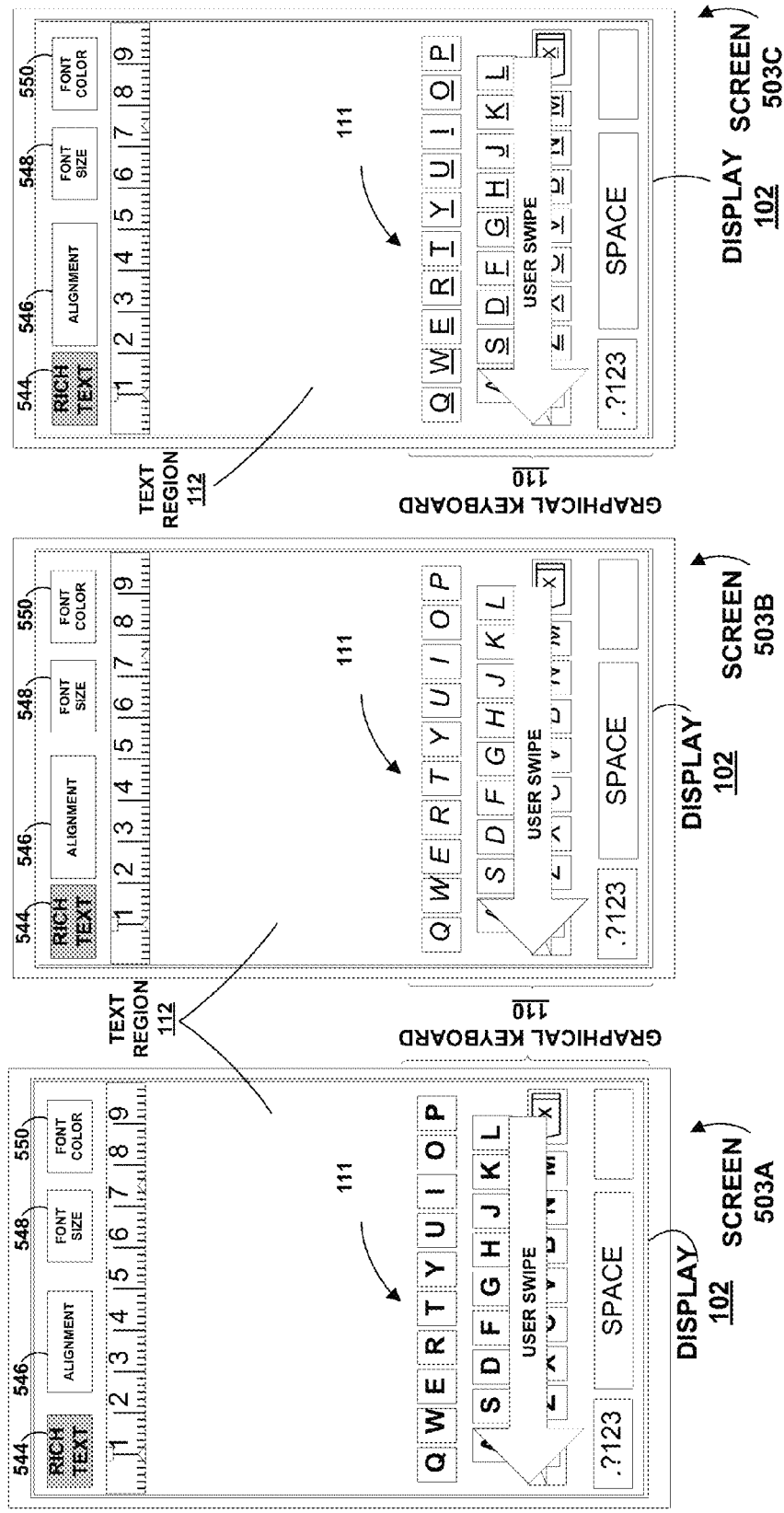
FIGS. 5A-5C are conceptual diagrams illustrating another example of a touch-sensitive device that may be configured to enable user selection of formatting options for text consistent with the techniques of this disclosure.

A user swipe (e.g., horizontal or vertical swipe) to transition between different formatting options as described with respect to FIG. 5 is only one example of an actuation mechanism that may be utilized to transition between different formatting options. Other non-limiting examples of actuation mechanisms that may be used include device detection by an accelerometer, gyroscope, GPS, camera element, ambient light detector, or other sensor of device. For example, accelerometer or gyroscope detection of a user shaking device 101 in space may cause a transition between different formatting options. In another example, accelerometer or gyroscope detection that a user has changed an orientation of device in space may cause transition between different formatting options. In another example, a camera element, ambient light sensor, or other sensor of device may be utilized to detect user intent to transition between different formatting options. Any other mechanism for detection of user input may be utilized to receive an indication from a user of selection of a formatting option consistent with the techniques of this disclosure.

FIGS. 6A and 6B are conceptual diagrams that illustrate one example of a touch-sensitive device 101 that may be configured to enable user selection of formatting options for text consistent with the techniques of this disclosure. FIG. 6A depicts a screen 603A that includes a graphical keyboard 110 similar to screen 103A depicted in FIG. 1A. However, screen 603A does not include a formatting toolbar 118 like screen 103A. Screen 603A further depicts detection of a user swipe (e.g., horizontal user swipe, from right to left) at display 102. As shown in FIG. 6B at screen 603B, in response to the detection of a user swipe, device 101 has caused graphical keyboard 110 to be replaced by a second keyboard, formatting option keyboard 618.

In various examples, formatting option keyboard 618 may enable a user to select, using selectable graphical keys, pull-down menus, or like mechanisms formatting options for text presentable in text region 112. For example, formatting option keyboard includes a graphical rule 615 that may be used to select tabs, margins, and/or like formatting characteristics for text. Formatting option keyboard 618 further includes user selectable rich text character keys 616 (including a strikethrough key in addition to bold, italics, and underlined keys). Formatting option keyboard further includes a series of pull-down menus for the selection of font options for text presentable in text region 112. For example, formatting option keyboard includes a font style (e.g., Times New Roman, Calibri) pull-down menu 642, a font size (e.g., 10 point, 12 point) pull-down menu 642, and a font color (e.g., red, black, green) pull-down menu 646.

Formatting option keyboard 618 further includes paragraph alignment keys 616, which are selectable by a user to input a desired paragraph alignment option. Formatting option keyboard 618 further includes highlighting pull-down menu 654, spell checker selectable button 656, and paragraph spacing (e.g., single, 1.5, double line spacing) pull-down menu 658. Formatting option keyboard 618 further includes text manipulation option keys, for cut, copy, and paste operations 648. Formatting option keyboard 618 further includes style keys 652. Style keys 652 may enable a user to select between different formatting styles (e.g., a number of different formatting options selected in combination such as bold, 12 point font in blue color, with single line spacing). Two style keys 652 are shown in the example of FIG. 6B. FIG. 6B merely depicts some examples of user selectable formatting options that may be provided by a formatting option keyboard 618 that replaces a graphical keyboard 110 in response to a directional user gesture as depicted in FIGS. 6A and 6B. Other examples of user selectable formatting options may be presented in a formatting option keyboard 618 and are consistent with the techniques of this disclosure. Furthermore, as described above with respect to FIGS. 5A-5C, in some examples, device 101 may be configured to initiate different operations if a directional gestures such as a horizontal swipe is detected at different regions of display 102. For example, if a directional gesture is detected at text display region 112, device 101 may cause different pages of a document, or a different document, to be displayed in text display region. On the other hand, if a directional gesture is detected at or near graphical keyboard 110 or at formatting option keyboard 618, device 101 may cause a transition between graphical keyboard 110 and formatting option keyboard 618, or vice versa.

Figure 6:
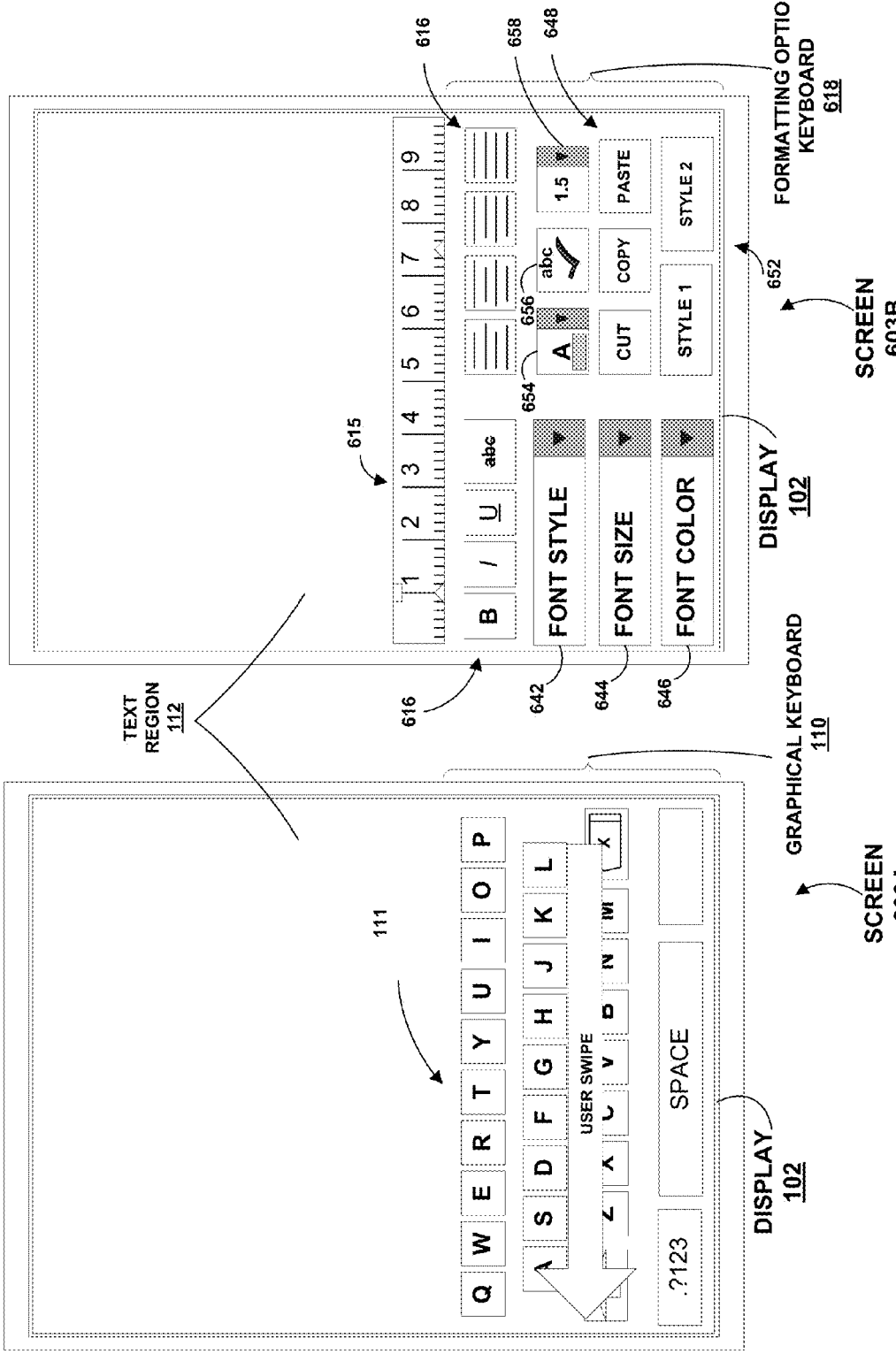
FIGS. 6A and 6B are conceptual diagrams illustrating one example of a touch-sensitive device that may be configured to enable user selection of formatting options for text consistent with the techniques of this disclosure.
Figure 7:
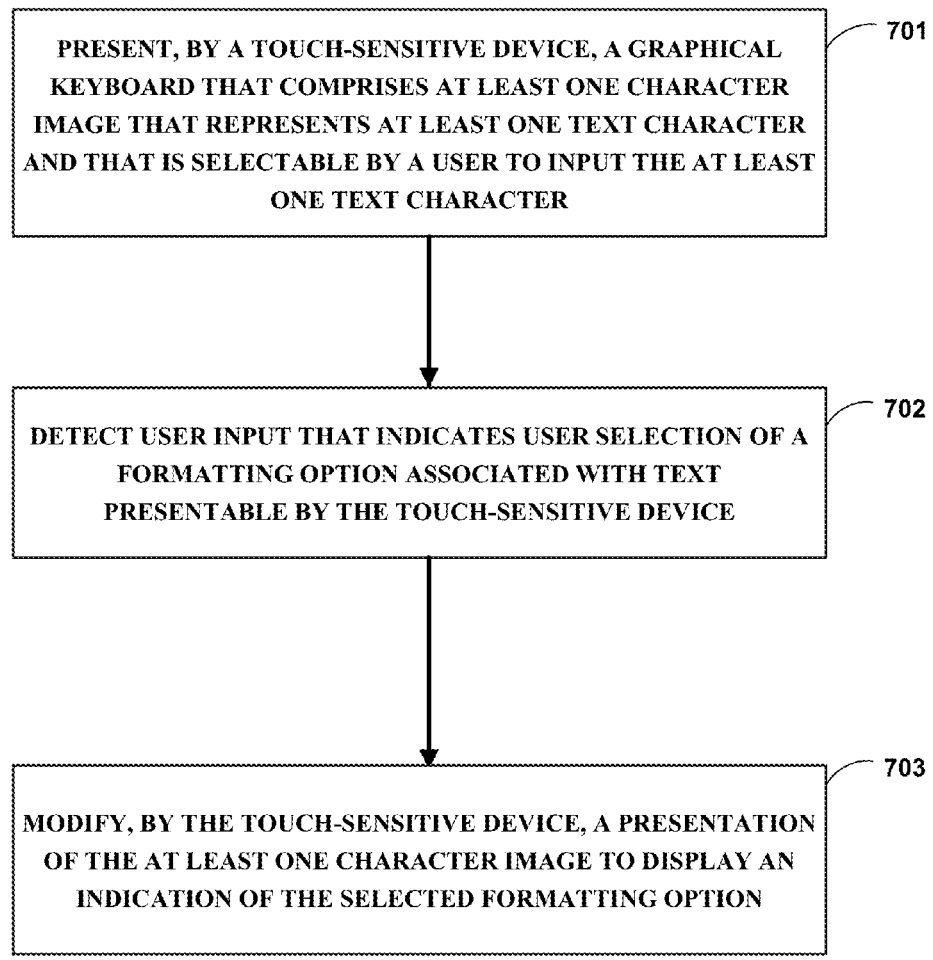
FIG. 7 is a flow chart diagram illustrating one example of a method of detecting user input for text-formatting consistent with the techniques of this disclosure.

FIG. 7 illustrates generally one example of a method of operating a device consistent with the techniques of this disclosure. In the description of FIG. 6 below, reference is made, for purposes of illustration only, to device 101 and other associated elements presented in FIGS. 1A, 1B, 2A, 2B, 4A, 4B, and 5A-5C. The disclosed method, however, is not limited to device 101 and other associated elements presented in FIGS. 1A, 1B, 2A, 2B, 4A, 4B, and 5A-5C. The method includes presenting, by a display 102 of a device 101, a graphical keyboard 110 (701). The graphical keyboard 110 includes at least one character image (e.g., key 111) that represents at least one text character and that is selectable by a user to input the at least one text character. The method further includes detecting user input that indicates user selection of a formatting option associated with text presentable by the touch-sensitive device 101 (702). The method further includes modifying, by the touch-sensitive device 101, a presentation of the at least one character image of the graphical keyboard to display an indication of the selected formatting option (703).

Figure 8:
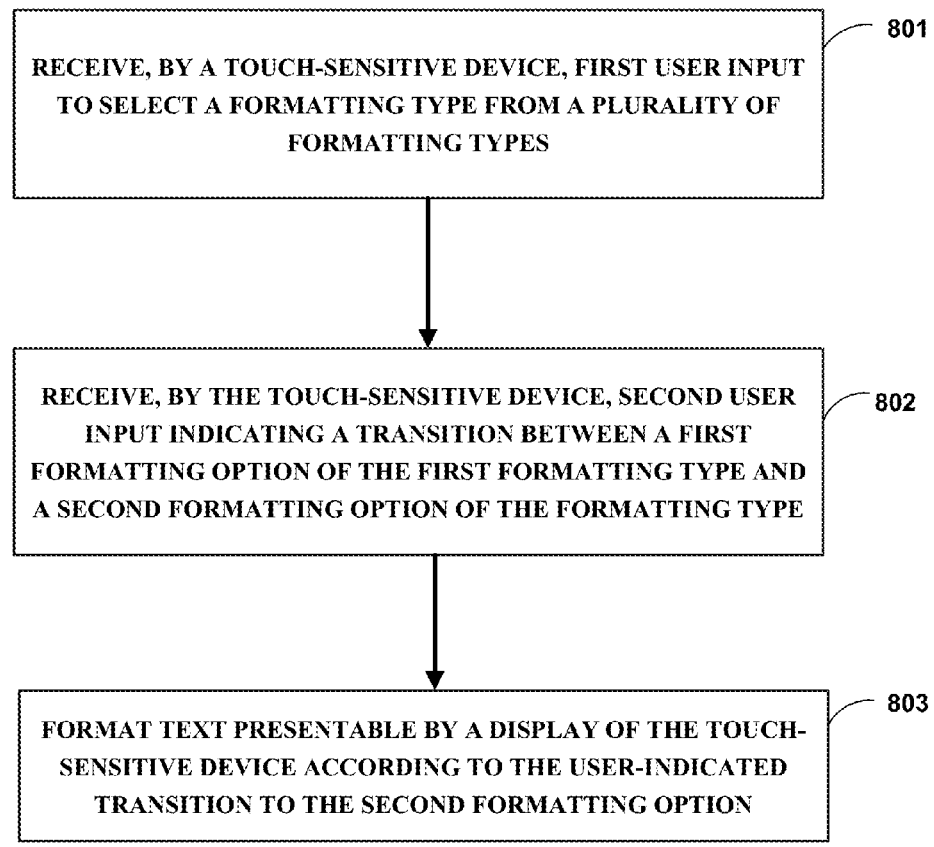
FIG. 8 is a flow chart diagram illustrating another example of a method of detecting user input for text-formatting consistent with the techniques of this disclosure.

FIG. 8 is a flow chart diagram that illustrates generally another example of a method of operating a device consistent with the techniques of this disclosure. In the description of FIG. 8 below, reference is made, for purposes of illustration only, to device 101 and other associated elements presented in FIGS. 1A, 1B, 2A, 2B, 4A, 4B, 5A-5C, and 6A-6B. The disclosed method, however, is not limited to device 101 and other associated elements presented in FIGS. 1A, 1B, 2A, 2B, 4A, 4B, and 5A-5C, and 6A-6B. The method includes receiving, by a touch-sensitive device (e.g., device 101), first user input to select a formatting type from a plurality of formatting types, wherein the formatting type comprises a grouping of formatting options for text presentable by a display (e.g., display 102) of the touch-sensitive device (801). The formatting type is grouping of formatting options for text presentable by a display of the touch-sensitive device. The method further includes receiving, by the touch-sensitive device, second user input indicating a transition between a first formatting option of the formatting type and a second formatting option of the formatting type (802). The method further includes formatting text presentable by a display of the touch-sensitive device according to the user-indicated transition to the second formatting option of the formatting type (803).

Receiving the second user input may include detecting a directional user gesture at or near the display of the touch-sensitive device. The directional gesture may be a horizontal swipe at or near the display of the touch-sensitive device. In some examples, the directional gesture is a first directional gesture detected at or near a text display region of the display. In one example, the method further comprises detecting a second directional gesture at or near a text display region of the display of the touch-sensitive device, and in response to detecting the second directional gesture, presenting a new document or page of a document at the text display region.

In one example, detection of the at least directional user gesture comprises detecting, by the device, a user swipe on a display of the device. In one example, a directional gesture detected at a graphical keyboard region of the display may cause transition between formatting options, and a directional gesture detected at a text display region of the display may cause another operation to be performed, such as transitioning between different documents or pages of a document.

Figure 9:
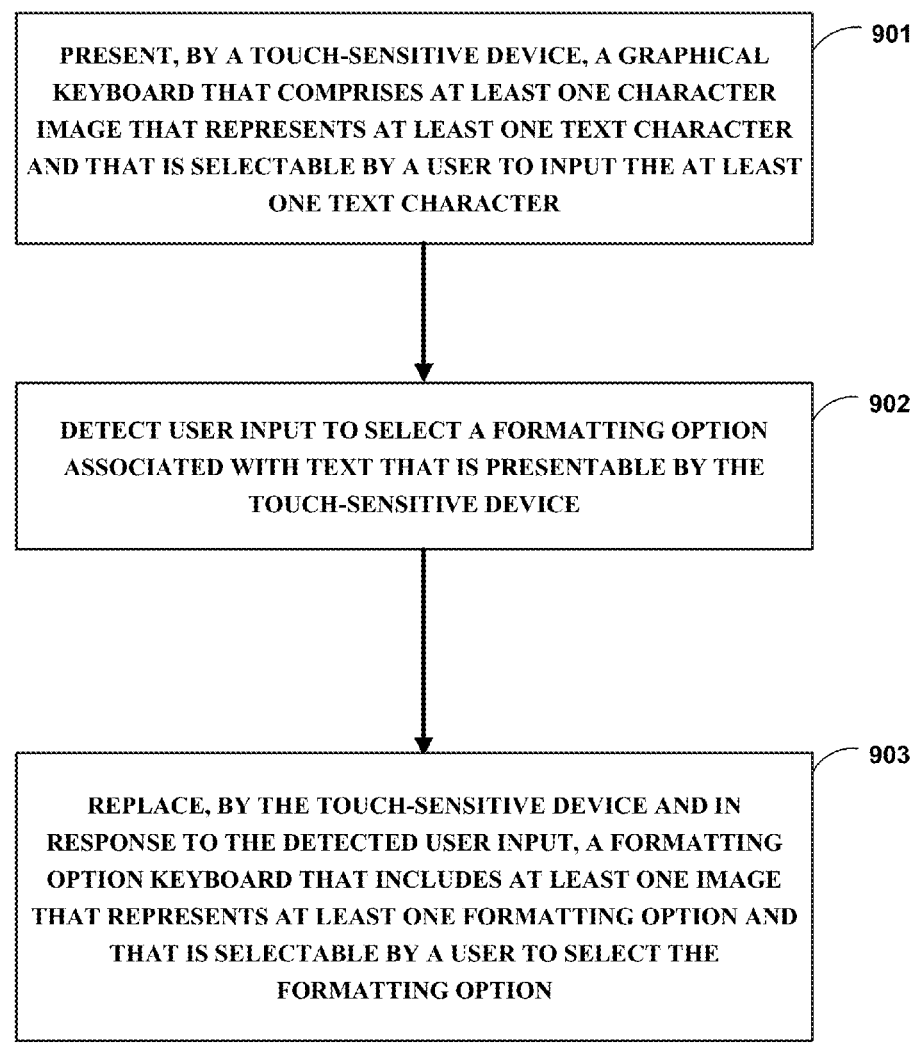
FIG. 9 is a flow chart diagram illustrating another example of a method of detecting user input for text-formatting consistent with the techniques of this disclosure.

FIG. 9 illustrates one example of a method of operating a device consistent with the techniques of this disclosure. The method includes presenting, by a touch-sensitive device (e.g., device 101), a graphical keyboard (e.g., graphical keyboard 110) that includes at least one character image that represents at least one text character and that is selectable by a user to input the at least one text character (901). The method further includes detecting user input to select a formatting option associated with text that is presentable by the touch-sensitive device (902). The method further includes replacing, by the touch-sensitive device and in response to the detected user input, the graphical keyboard with a formatting option keyboard (e.g., formatting option keyboard 618) that comprises at least one image representing at least one formatting option that is selectable by a user to select the formatting option (903).

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in a computer-readable medium, such as a computer-readable storage medium, containing instructions. Instructions embedded or encoded in a computer-readable medium, including a computer-readable storage medium, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may comprise one or more computer-readable storage media.

Various examples consistent with the techniques of this disclosure have been described. These and other examples are within the scope of the following claims.

The invention claimed is:

1. A method, comprising:
    outputting, by a computing device and for display, a graphical keyboard, wherein the graphical keyboard comprises a plurality of character graphics that each represents at least one respective character, each of the plurality of character graphics being selectable to input the at least one respective character;
    receiving, by the computing device, an indication of a selection of at least one paragraph formatting option; and
    outputting, by the computing device and for display, a modified representation of the graphical keyboard, the modified representation comprising the plurality of character graphics arranged in accordance with the at least one paragraph formatting option.

2. The method of claim 1, wherein receiving the indication of the selection of the at least one paragraph formatting option comprises receiving an indication of a selection of one or more icon images.

3. The method of claim 1, wherein receiving the indication of the selection of the at least one paragraph formatting option comprises receiving an indication of a selection of an option from a pull-down menu.

4. The method of claim 1, wherein receiving the indication of the selection of the at least one paragraph formatting option comprises receiving an indication of a change in orientation of the computing device.

5. The method of claim 1, wherein receiving the indication of the selection of the at least one paragraph formatting option comprises receiving an indication of movement of the computing device.

6. The method of claim 1, wherein receiving the indication of the selection of the at least one paragraph formatting option comprises receiving an indication of a gesture.

7. The method of claim 1, wherein outputting the modified representation comprises outputting the graphical keyboard with the plurality of character graphics collectively having an alignment in accordance with the at least one paragraph formatting option.

8. The method of claim 1, wherein outputting the modified representation comprises outputting the graphical keyboard with the plurality of character graphics constrained by one or more margins in accordance with the at least one paragraph formatting option.

9. The method of claim 1, wherein outputting the modified representation comprises outputting the graphical keyboard with the plurality of character graphics collectively having a justification in accordance with the at least one paragraph formatting option.

10. The method of claim 1, wherein receiving the indication of the selection of the at least one paragraph formatting option comprises receiving an indication that a cursor has been placed at or near text outputted for display.

11. The method of claim 1, wherein receiving the indication of the selection of the at least one paragraph formatting option comprises receiving an indication of a selection of text outputted for display.

12. The method of claim 1, further comprising:
    outputting, for display, an option to select a formatting type, wherein the formatting type comprises a plurality of paragraph formatting options,
    wherein receiving the indication of the selection of the at least one paragraph formatting option comprises receiving an indication of a gesture to transition between the plurality of paragraph formatting options of the formatting type.

13. The method of claim 12,
    wherein the plurality of paragraph formatting options includes the at least one paragraph formatting option.

14. A computing device, comprising:
    at least one processor, wherein the at least one processor is operable to:

output, for display, a graphical keyboard, wherein the graphical keyboard comprises a plurality of character graphics that each represent at least one respective character, each of the plurality of character graphics being selectable to input the at least one respective character;

receive an indication of a selection of at least one paragraph formatting option; and output, for display, a modified representation of the graphical keyboard, the modified representation comprising the plurality of character graphics arranged in accordance with the at least one formatting option.

15. An article of manufacture comprising a computer-readable storage medium that stores instructions that, when executed, cause a computing device to:

output, by the computing device and for display, a graphical keyboard, wherein the graphical keyboard comprises a plurality of character graphics that each represent at least one respective character, the plurality of character graphics being selectable to input the at least one respective character;

receive, by the computing device, an indication of a selection of at least one paragraph formatting option; and output, by the computing device and for display, a modified representation of the graphical keyboard, the modified representation comprising the plurality of character graphics arranged in accordance with the at least one paragraph formatting option.

* * * * *